Nov. 26, 1957 P. A. MARSAL 2,814,662
DEFERRED ACTION GALVANIC CELL
Filed Dec. 14, 1953
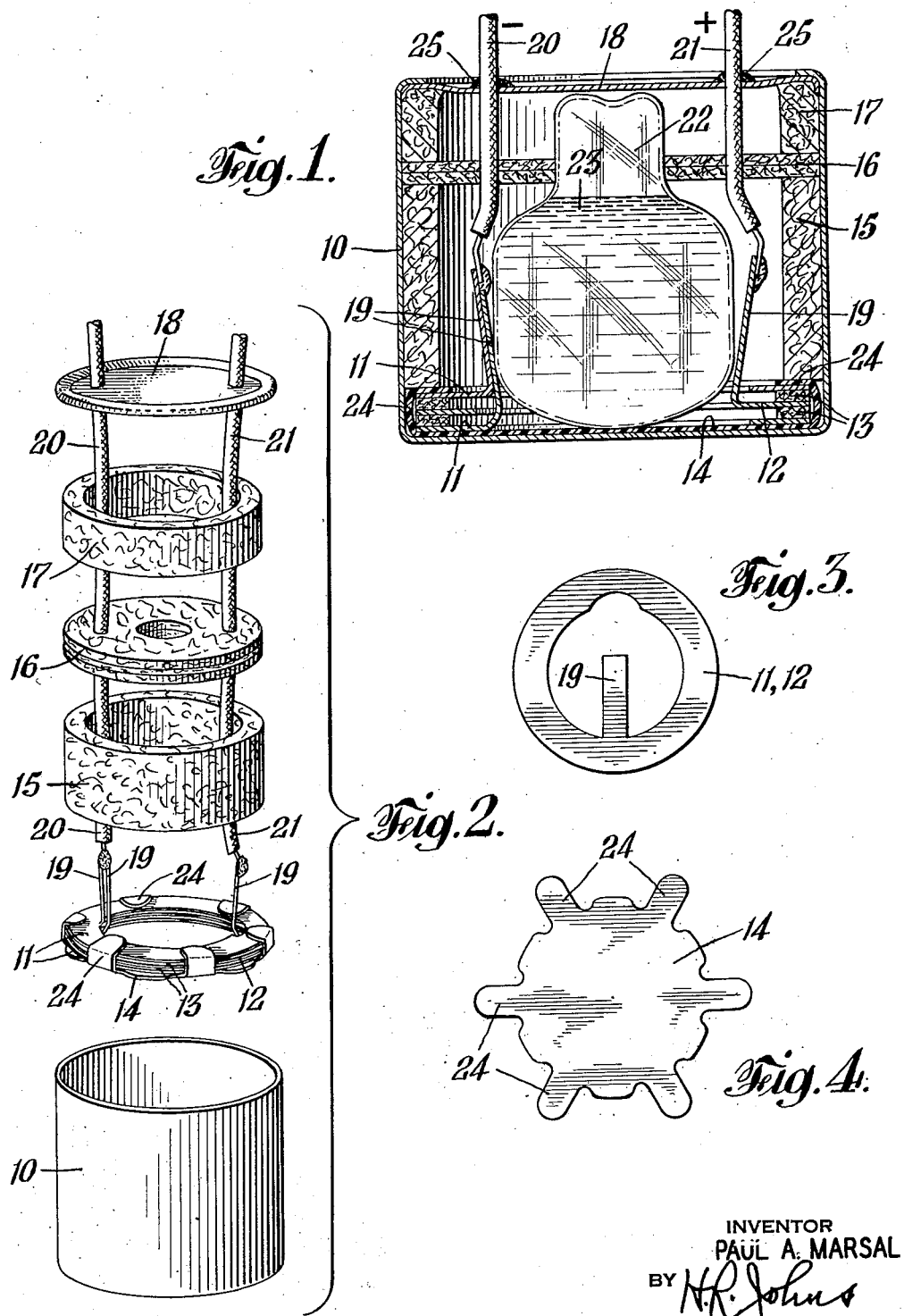
INVENTOR
PAUL A. MARSAL
BY
ATTORNEY

United States Patent Office 2,814,662
Patented Nov. 26, 1957

2,814,662
DEFERRED ACTION GALVANIC CELL

Paul A. Marsal, Rocky River, Ohio, assignor to Union Carbide Corporation, a corporation of New York Application December 14, 1953, Serial No. 397,961

9 Claims. (Cl. 136—113)

This invention relates to a deferred action type galvanic cell capable of delivering its voltage peak quickly upon rupture of an ampule containing electrolyte, and capable of effecting such rapid activation over a wide temperature range. An object of this invention is to provide an absorptive spacer capable of absorbing all the electrolyte some time after activation and discharge have started. Another object is to provide such a cell having a novel ampule positioning means. A further object is to provide a soft deformable metal top through which a blow may be transmitted to the frangible ampule to effect its rupture without rupture of said soft metal top.

Referring to the drawings, Fig. 1 is a vertical cross section through a preferred embodiment of this invention. Fig. 2 is an exploded view of the cell except for the ampule. Fig. 3 is a top plan view of one of the electrodes. Fig. 4 is a top plan view of the star washer which holds the electrodes together as a unit with insulation therebetween.

The outer container 10 is a zinc can having walls about .014 inch thick, a diameter of 1¼ inches and a height of about 1 inch. Both electrodes are of the flat metal type shown in Fig. 3 and located at the bottom of the container 10. The anodes 11 are preferably of zinc or lead. The cathode 12 is a non-flaking lead peroxide coating on a nickel foundation. These electrodes are separated by insulating washers 13 about .03 inch thick and of any appropriate material for the purpose. At the base of the container on the inside is a star washer 14 of the shape shown in Fig. 4 after it has been stamped out of appropriate insulating material and before it has been bent to clamp permanently the spaced electrodes as shown in Fig. 2.

Above the unit of electrodes is an absorptive spacing insulator 15 of cardboard or any other suitable material. Above the spacer 15 is a splash baffle ring 16 of cardboard about .04 inch thick which is provided with an axial perforation of a size to fit around the neck of the ampule and position it within the container. Above the baffle 16 is another insulating spacer 17 of similar material to the spacer 15. A soft zinc cover 18 .014 inch thick is held in place against the spacer 17 by reason of the top upper edge of the container 10 being spun over its cover.

Each of the electrodes 11 and 12 is provided with an inwardly projecting tab 19 adapted to be bent up as shown in Fig. 1 and to which the terminal leads 20 and 21 are soldered or otherwise secured. These electrodes are so arranged that their tabs 19 are substantially opposite one another and constitute a guide means for centering or positioning the ampule 22. The ampule is of glass about 0.01 to 0.02 inch thick. A borosilicate glass is preferred. The level of the electrolyte in the ampule is about at the height shown by the dotted line in Fig. 1. The electrolyte 23 within the glass ampule is of 45% fluoboric acid of about 2.6 cc. volume. The electrochemical system selected permits a quick voltage build-up at temperatures as far apart as —40° F. and +140° F. The projecting tabs 24 on the star washer 14 are bent up and around the electrode unit to clamp the parts in position as shown in Figs. 1 and 2. A rubber cement 25 seals the perforations in the cover 18 and serves as bushings around the conducting leads 20 and 21.

The cathode 12 can be specially prepared by depositions having a dull grey sheen, using the following technique.

(1) Cleaning the electrode in hot strong alkaline solution.
(2) Rinsing in hot water.
(3) Pickling in a solution containing 200 cc. of water, 300 cc. of $H_2SO_4$, 450 cc. $HNO_3$, and 6 grams of common salt.
(4) After pickling, this electrode is rinsed in hot water.
(5) It is next flashed and plated using a bath of 18.7 ml. of $HNO_3$, 112.5 grams of $Pb(NO_3)_2$ and 275 ml. of water.

The electrode is flashed at from 2.5–3.5 amperes for five seconds when the voltage across the bath starts at about .04 and increases as the lead oxide deposits. The plating occurs at .25 ampere (1.96 volts) for a half hour for deposition of a coating .0005 inch of lead peroxide per side. These rates are given for a cathode of 8.8 sq. inch total area. The plating electrodes are both preferably of nickel. It has been found that electrodes plated by the foregoing method are sufficiently non-flaking to withstand cutting with a pair of tin snips or punching in a die and capable of withstanding a reasonable amount of bending. As shown in Fig. 3 each of these electrodes is shaped so that opposite the tab 19 a recess is provided as illustrated to allow tabs of opposite polarity to project upwardly as shown without danger of contacting an electrically opposite electrode.

The use of zinc as the anode material is appropriate for a relatively short discharge interval, i. e. 15 seconds to one minute when the electrolyte mentioned is used due to the fact that "trees" are formed which bridge across the electrodes and ultimately short circuit the cell if the current discharge period is too long, say from 2 to 10 minutes. When longer service life is desired, lead or lead plated anodes may be used. These do not cause "treeing."

The star washer 14 is preferably punched from an insulating sheet of thermoplastic material about .015 inch thick. Suitable material is a cellulose ester known under the trade name of "Tenite," or a methyl methacrylate known under the trade names of "Lucite" or "Plexiglas"; any other appropriate material having suitable stiffness to hold the electrodes together as a unit, may be used. The long tabs 24 are bent upward at about a 90° angle by passing the washer through a heated cylinder having an inside diameter equal to the diameter across the shorter tabs at a temperature of from 150° to 160° F. The spacing washers 13 may be of the same material as the star washer 14 or of any other appropriate plastic insulating material, or less expensive material such as manila board or tag board may be used.

After soldering the terminal leads to the tabs 19, the electrode unit shown in Fig. 2 is placed in the bottom of the container 10 after which the elements 22, 15, 16, 17 and 18 are put into place. Then the top edge of the outer container 10 is spun over to hold the top plate in place and the rubber cement 25 is put in position around these terminal leads 20 and 21 where they pass through the cover 18. The application of rubber cement seals the inside of the cell from the atmosphere. A typical cell has an electrode area of ½ a square inch for both the anode and cathode. Some idea of the voltage build-up of such a cell may be shown as follows:

| Temp., °F. | Load, ohms | Closed circuit, volts | |
|---|---|---|---|
| | | 1 sec. | 10 sec. |
| −40 | 66 | 1.42 | 1.69 |
| 32 | 79 | 2.01 | 2.09 |
| 68 | 86 | 2.08 | 2.14 |
| 140 | 100 | 2.07 | 1.98 |

The battery is activated by a blow struck midway between the two terminal leads 20 and 21 from a spring loaded plunger having a tip diameter of 1/8 to 3/16 inch and a stroke of about 1/8 of an inch. Such a plunger not being a part of this invention is not illustrated but it strikes the metal top 18 with sufficient force to fracture the frangible ampule without fracture of the soft metal top 18. As is well known in the art the plunger should be arrested by external means after the soft metal top 18 has been deformed about 1/8 of an inch. A fracture of the ampule occurs in less than one second.

This particular cell may be stored for an indefinite length of time before actuation. It is known that at least five and a half years of storage did not affect its usefulness. An advantage of this invention is the fact that its cost may be reasonable because of its having been made from standard battery parts. In contrast to the wide temperature range in which this battery functions, attention may be called to the fact that sea water or salt water used in some cells will freeze in temperature of +30° F. whereas the present cell requires a temperature below −40° F. before failure occurs. The electrodes being sealed from the ambient atmosphere have long life as does the electrolyte sealed in the ampule to avoid evaporation or oxidation. The electrolyte is absorbed by a wicking action of the cardboard tubing 15 and 17 subsequent to discharge of the cell, thus making it leakproof. The porosity of the absorptive spacers 15 and 17 is such as to absorb all of the electrolyte within about ten minutes. The insulating ring 16 maintains the ampule in this upright position to insure fracture from a plunger or a hammer.

A number of uses are appropriate for this cell, such as for alarm systems, emergency exit lights in buildings, and in connection with a detector for dragging objects from a rail car. The ampule is of glass about .01 to .02 inch thick, such as is used by the medical profession. The absorptive spacing means constitute an insurance against electrolyte leakage.

I claim:

1. A leakproof deferred action cell operative over the temperature range of −40° F. to +140° F., said cell comprising an outer container; generally flat, disc-type electrodes parallel with and adjacent a base of said container, said electrodes having a central perforation therein, and being separated by a similarly configurated disc of insulating material, said electrodes having upstanding conducting leads generally parallel to the walls of said container, and projecting outwardly therefrom; a frangible ampule containing electrolyte supported in said container and within said central perforations of said electrodes and disc; electrolyte-absorbing and insulating liner means surrounding said ampule between said electrodes and an upper portion of said container; a deformable metal top for said container, the upper portion of said container being spun over said top; said top being so positioned relative to said ampule as to effect the rupture thereof upon its deformation; said top also having perforations to allow passage of said upstanding conducting leads; absorbent baffle means between said electrodes and said top, said baffle means fitting around the upper portion of said ampule to further secure the same within said container, spacing means between said baffle means and said top; and means on said top sealing said container from the ambient atmosphere.

2. A cell according to claim 1, but having a relatively short discharge interval of the order of 15 seconds to one minute, wherein one of said electrodes consists of zinc metal.

3. A cell according to claim 1 wherein one of said electrodes consists of lead metal.

4. A cell according to claim 1 wherein said metal top is of soft zinc.

5. A cell according to claim 1 wherein said electrolyte-absorbent and insulating liner means consist of cardboard of such dimension as to absorb substantially all the electrolyte of said ampule after rupture thereof.

6. A cell according to claim 1 wherein one of said electrodes consists of a non-flaking lead peroxide coating on a nickel foundation.

7. A cell according to claim 1 wherein said electrolyte is 45 percent fluoboric acid.

8. A cell according to claim 1 wherein said sealing means consist of rubber cement placed about the perforations in said metal cover, and serve also as bushing for said conducting leads.

9. A deferred action cell comprising an outer container, electrodes generally parallel with and adjacent a base of said container, said electrodes being provided with a central perforation, a bent tab projecting upwardly from an electrode of one polarity and a radially opposite tab projecting upwardly from an electrode of opposite polarity, each such tab being located on an inner peripheral portion of its electrode, an ampule supported on the base of said container within said perforations and between said tabs, the tabs constituting a positioning and centering means for said ampule, an insulating liner for said container, and at least one insulating disc supported by said liner, having a central perforation therein through which a neck of said ampule may project, said insulating disc constituting a splash baffle on rupture of said ampule and also constituting a positioning and centering means for an upper portion of said ampule, a metal top for said container adjacent a top of said ampule, and spacing means between said top and said insulating disc ampule centering means.

References Cited in the file of this patent

UNITED STATES PATENTS

| 675,600 | Hough | June 4, 1901 |
| 2,403,567 | Wales | July 9, 1946 |
| 2,674,946 | Hjelm | Apr. 13, 1954 |

FOREIGN PATENTS

| 336,844 | Great Britain | Oct. 23, 1930 |